United States Patent [19]

Rhoten

[11] 4,426,919

[45] Jan. 24, 1984

[54] AUTOMATIC BREWING APPARATUS

[75] Inventor: Kenneth D. Rhoten, Evansville, Ind.

[73] Assignee: Robert S. Smith, Hartford, Conn.

[21] Appl. No.: 280,789

[22] Filed: Jul. 6, 1981

[51] Int. Cl.³ .............................................. A47J 31/34
[52] U.S. Cl. .................................. 99/289 T; 99/302 R
[58] Field of Search ............. 99/289 R, 289 T, 289 P, 99/289 D, 280, 281, 282, 283, 302 R, 302 C, 302 FB, 302 P

[56] References Cited

U.S. PATENT DOCUMENTS

| 3,327,615 | 6/1967 | Swan | 99/289 R |
| 3,354,811 | 11/1967 | King | 99/289 T |
| 3,356,011 | 12/1967 | Parraga | 99/289 T |
| 4,134,332 | 1/1979 | Merman | 99/289 T |

Primary Examiner—Robert W. Jenkins

[57] ABSTRACT

An automatic brewing apparatus having a reservoir of water heated by a thermostatically controlled heater which is pumped via flexible conduit to a movable head which temporarily seals and communicates with a special packet of coffee or other brewable substance and produces a beverage by rapid infusion. Packets are mounted upon a tape which threads through a brewing basket where infusion takes place while the tape is initially wound upon a supply reel which feeds a take-up reel after passage through the brewing basket. The cooperation of these features is brought about by a control circuit which is activated by a momentary switch and consequently causes, through a drive means, the passage of the tape through the brewing basket until a packet is centered. The control circuit then stops tape passage, activates the movable head to communicate with the packet and activates a pump to force water through the grounds, brews the beverage and then shuts the apparatus off.

8 Claims, 9 Drawing Figures

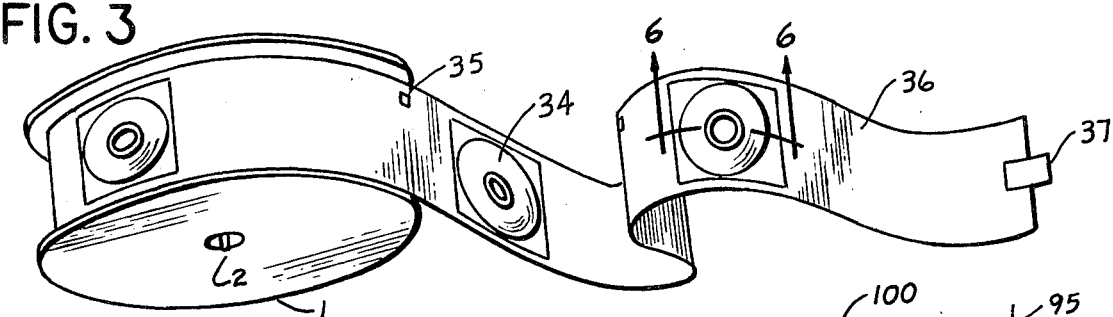
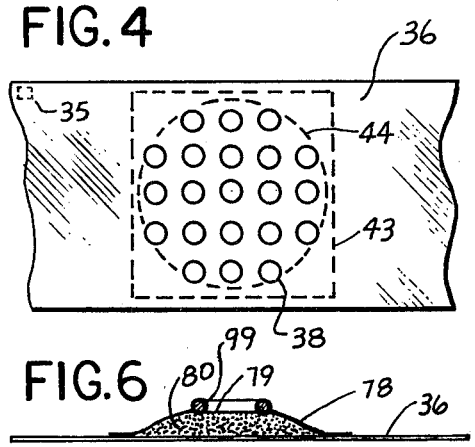
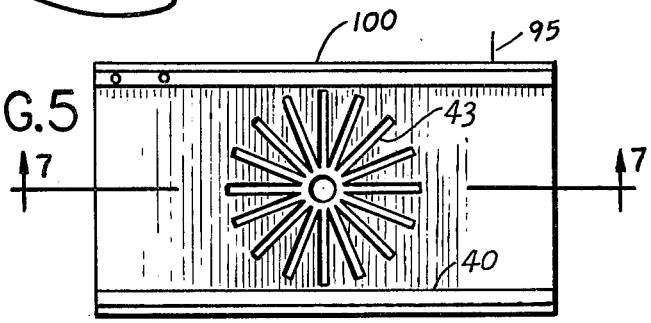
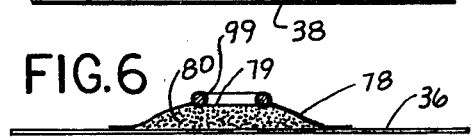
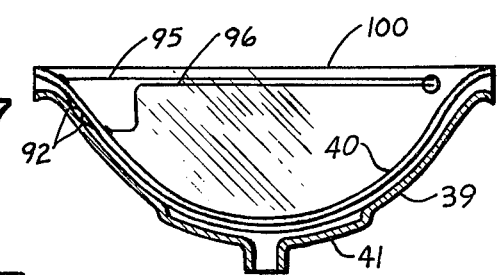
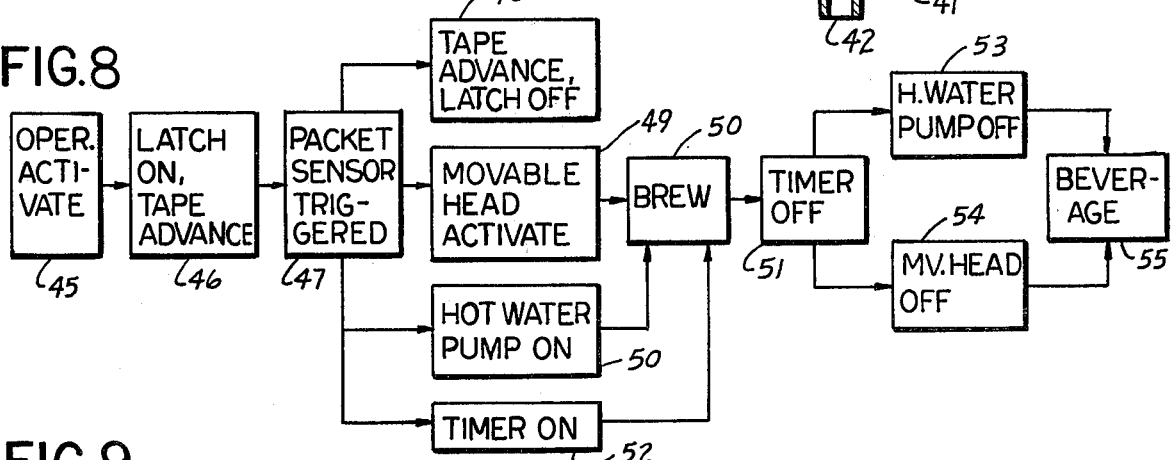
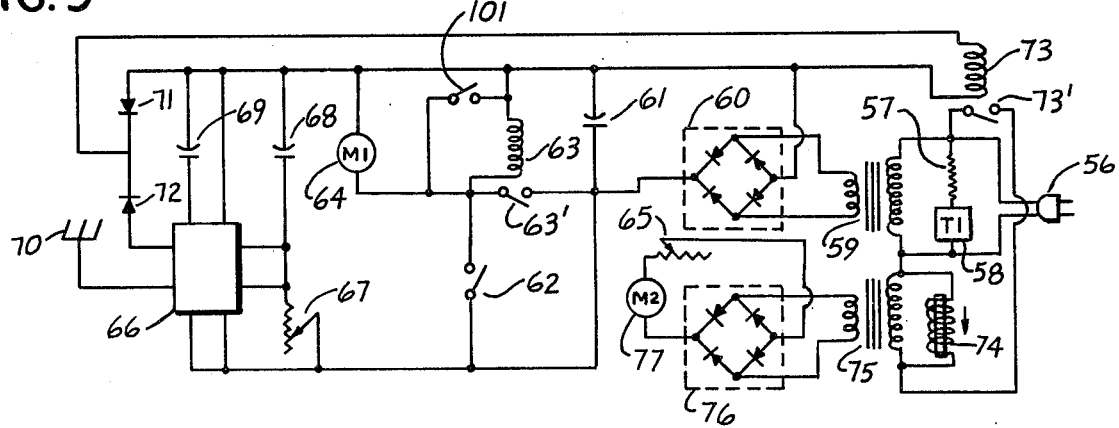

AUTOMATIC BREWING APPARATUS

SUMMARY OF THE INVENTION

The invention relates to apparatus for brewing coffee and teas in which automatic features are incorporated in order to minimize toil and effort. More specifically, the invention is concerned with brewing apparatus which employ the so-called "infusion" process in which the desired compounds are extracted from the grounds by water held below the boiling point. A number of more or less automatic devices using this process exist and most such apparatus is directed toward the end of providing coffee with flavor superior to that obtained through the well-known percolator method and others. The chief problem in other brewing methods is that if extraction is carried on above the boiling point, various aromatic compounds are lost while other less desirable compounds are brought out from the grounds which makes for a brew of inferior taste.

Known brewing apparatus that employ the infusion process and various automatic features have generally been either too complex and costly for consumer use or simplified to the extent that the operator still must manually perform many functions. Also, as the flavor of coffee is quickly lost after brewing, conventional brewing apparatus often provide stale or strong coffee some time after brewing owing to the length of time the brew must stand. Furthermore, such apparatus must be continually cleaned and spent grounds must be manually disposed of. Alternative approaches to coffee brewing have almost always been at the expense of flavor. Instant coffee powders and the like are still considered unsuitable to the tastes of most coffee drinkers.

Another objection to known brewing apparatus is that the brewing process requires a considerable length of time. In addition, much of the operator's time is spent cleaning these various devices and toiling with coffee grounds. These problems become objectionable in an increasingly complex and modern society in which time is quite valuable.

Accordingly, it is a primary object of the present invention to provide a brewing apparatus employing an improved means of extraction in order to speed up the brewing process considerably while at the same time providing a novel means of transporting and containing the grounds before, during and after extraction.

Another object of the invention is to provide an automatic control and transport system, novel in nature, which provides a means of convenient activation, transport of the grounds, control of quality and timing of the apparatus so that various functions occur in their proper sequence.

A further object of the present invention is to provide an improved brewing apparatus of the foregoing type which requires a minimum of operator maintenance by virtue of the novel extraction, containment, transport and control means.

Still another object of the invention is to provide a brewing apparatus of the foregoing type in which the control system causes the device to meter a specific amount of brew thereby enabling the operator to brew each cup individually.

Another object of the invention is to provide a novel means of controlling the strength of the brew by adjusting the rate of water flow through the grounds.

Yet another object of the invention is to provide a new and novel brewing basket which not only allows automatic transport of fresh and spent grounds but acts as a vessel in the containment of coffee "overflow" during brewing and is designed in such a way as to minimize the need for cleaning.

An additional object of the invention is to provide an apparatus that requires a minimum of operator effort in the handling of ingredients.

Other objects and advantages of the invention will be apparent from the following description and drawings that accompany which show a preferred embodiment of the invention.

DESCRIPTION OF DRAWINGS

FIG. 3 is a perspective view of the packet reel assembly of the present invention.

FIG. 4 is a posterior view of a segment of tape which is wound upon the reel assembly of the invention and shows important features.

FIG. 5 is a top view of the brewing basket employed in the present invention.

FIG. 6 is a sectional view of a "coffee packet" affixed to the tape employed in the invention and may be interpreted as being taken at 6—6 in FIG. 3.

FIG. 7 is a sectional view of the brewing basket employed in the invention and is taken at 7—7 in FIG. 5.

FIG. 8 is a flow diagram illustrating the process and sequence of events utilized in the invention and represents them in diagrammatic form so that the operation of the invention may be clearly understood.

FIG. 9 is an electrical schematic of the control means of the present invention.

DETAILED DESCRIPTION

Figure 1:
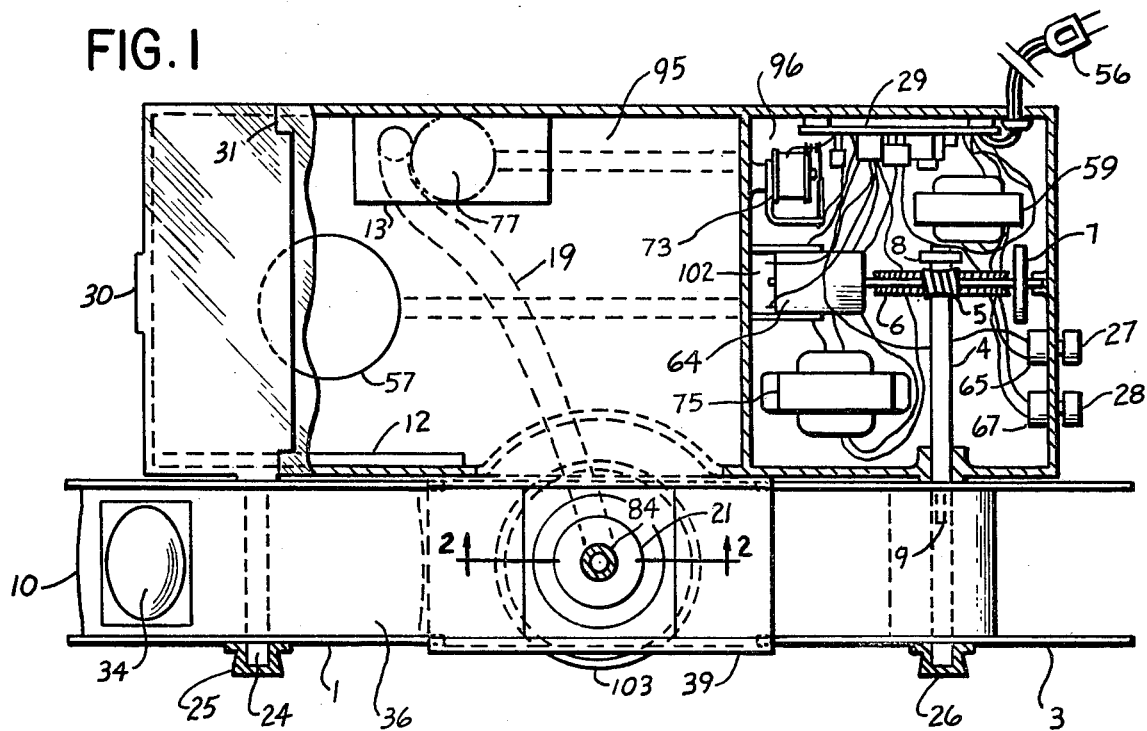
FIG. 1 is a plan view, generally taken at line 1—1 of FIG. 2 showing the general arrangement of the apparatus and is partly fragmentary to show further detail.

Reference is now made to the embodiment of the invention illustrated in the drawings so that the invention may be clearly understood. No limitation of the scope of the invention is intended, modifications and alterations of the invention as illustrated being contemplated as would normally occur to one skilled in the art to which the invention relates.

FIG. 1 clearly shows the general layout of the invention and the various components employed. The housing of the invention is divided into reservoir 95 and compartment 96 and is preferably molded as a single part. Reservoir 95 is sufficiently leak-proof so that it may hold a volume of water which is heated to a temperature just below the boiling point of the water by thermostatically controlled heater 57, shown only diagrammatically for the sake of clarity. Reservoir 95 may be filled via lid 30 which may be facilitated, for example, by hinge(s) 31. Note that insulative material 12 is affixed to a portion of the inside wall of reservoir 95. This material, such as well-known styrafoam, serves to protect stored coffee from the heat of reservoir 95. Also contained within reservoir 95 is pump motor 77 and pump 13, shown only diagrammatically in this view. Directly adjacent to reservoir 95 is compartment 96 which houses the reel drive mechanism, electrical control circuit board 29, transformer 75 which supplies direct current power to pump motor 77, control potentiometers 65 and 67, relay 73 and transformer 59 which supplies the control circuit power. Control potentiometers 65 and 67 are supplied with knobs 27 and 28 respectively. Reel drive motor 64 utilizes an extended shaft upon which is mounted worm 5 and flywheel 7 and is rigidly affixed to the wall of compartment 96 by suitable mount 102. Worm 5 mates with worm gear 6 which is securely fastened or otherwise keyed to shaft 4 which is supplied with bearing bracket 8 at one end while being provided with bearing at the other end by the sidewall of compartment 96. Shaft 4 is itself preferably keyed by key 9 or otherwise suitably secured to reel 3 which primarily may consist of two flat discs affixed either side of and centered with a cylinder which is preferably hollow. Reel 3 is kept in proper position upon shaft 4 by end grip 26 which is preferably made of rubber or other flexible material, although other securing means may be used. Reel 1 is identical to reel 3 for the purposes of this description but is free to rotate about shaft 24, being suitably affixed to or integrally molded to the wall of reservoir 95. Grip 25 is identical to grip 26 for the purposes of this description. Wound upon reel 1 is tape assembly 10 which is shown in greater detail in FIG. 3. Affixed to tape 36 is packet 34 which is shown in greater detail in FIG. 6.

Figure 2:
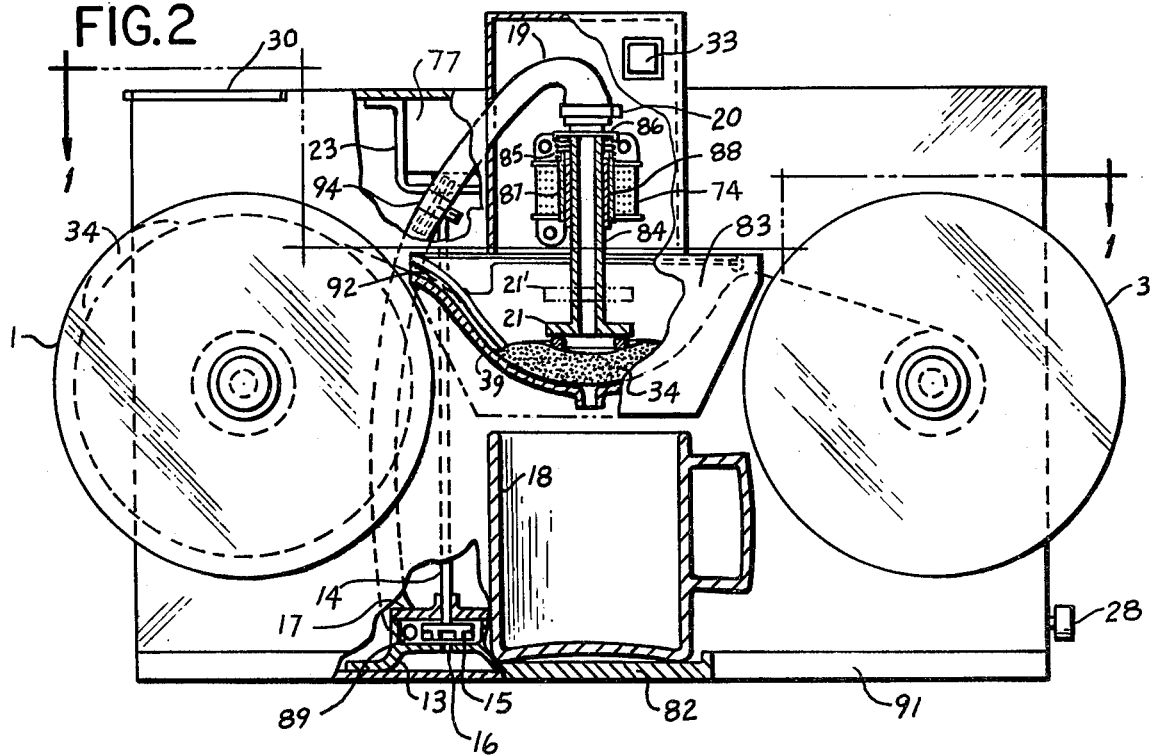
FIG. 2 is a partly fragmentary front view showing various external features of the invention while also showing details that would otherwise be hidden.

FIG. 2 illustrates many important features of the invention and reference to it is now made. Motor 77 is provided with an extended shaft which is affixed to rotor 15 which, in combination with housing top 17 and lower housing 13, form a small centrifugal pump. Inlet to the pump is provided by port 16 and outlet is provided by port 89 which communicates with flexible conduit 19 by a suitable nipple or other means. The chamber of lower housing 13 is formed or molded so that the internal cavity containing the rotor is a suitable spiral shape to allow centrifugal action. Note that motor 77 is equipped with mounting bracket 23 which rigidly secures the motor to the top of reservoir 95.

Flexible conduit 19 communicates with movable head 21 via conduit 84 which may normally be integrally molded to movable head 21. Flexible conduit 19 is shown secured to conduit 84 by clamp 20. Of utmost importance to the invention is steel sleeve 88 which is rigidly secured to conduit 84 and is allowed to slide freely in a normally vertical fashion by the relatively close tolerances between it and steel sleeve 87 which remains static. This sliding action may be aided by a suitable lubricant. Static steel sleeve 87 is affixed to coil 74, the coil responding to electrical current in such a way as to affect a solenoid action upon steel sleeve 88 and consequently 88, 84 and 21 as an assembly. Also affixed to conduit 84 is retaining washer 86 which acts as a guide and containment means for spring 85 shown in compression. It is obvious that the movable head assembly, comprising said parts 86, 84, 88 and 21, will normally revert to position 21[1], shown partially in phantom, when the coil is not energized due to the action of spring 85. However, when the coil is properly energized it will be seen that the movable head assembly will assume the position shown more appropriately in the drawing and defined at 21 while resting firmly upon packet 34. Note that packet 34 rests upon the bottom of brewing basket 39 which is partly shown in this view behind cover 83. Since coil 74 and related assembly represents the activation means of movable head 21, further reference to it will be as solenoid 74 and will imply the effect of the whole assembly via the solenoid coil.

Note that flexible conduit 19 is interrupted by siphon relief valve 94 which is primarily a fitting communicating at each end with flexible conduit 19 and has a small orifice in its side which must be kept above water level in reservoir 95. Cup 18 rests upon pedestal 82 which is equipped with ridge 103 to retain the cup directly below the brewing basket. An absorbent pad, such as a sponge, may be placed upon tray 91 in order to collect any drippings from the apparatus.

The reel assembly shown in FIG. 3 is the primary storage means used in the apparatus for the containment and retrieval of coffee or other brewable substance. Reel 1 is as previously described while wound about it is tape 36, being any suitable, reasonably stiff yet pliable waterproof tape which is relatively thin and moderately resistant to heat. Glued or otherwise securely fastened to tape 36 is packet 34 and sensor patch 35 which consists of a small area of thin, conductive material such as copper or aluminum which is glued or otherwise secured to tape 36. These packets and sensor patches are spaced carefully on the tape so that the wound tape will efficiently utilize its space by the staggering of the packets. Thus any space between two wound adjacent packets, though not necessarily consecutive, will be juxtaposed by packets of the following layers and so on until the space is efficiently used. Sensor patches 35 may immediately precede or follow the packets, but in the embodiment disclosed, each packet is preceded by a sensor patch. The distance between the center of each sensor patch and the center of each packet is, by sound example, a small fraction of an inch less than the distance between the center of the pair of sensors 92 and the center of the coffee outlet 42 of the brewing basket shown in FIG. 7. Tape 37 allows adhesion to reel 3.

FIG. 4 illustrates a section of the above-mentioned tape shown directly beneath a packet. Sensor patch 35 is shown affixed to the opposite side of the tape while the main body of the packet containing coffee or other herb is defined by hidden line 44. The outer edges of the packet are defined by hidden lines 43 while a series of perforations 38 appear upon the tape directly beneath the packet. This arrangement is typical for each packet.

FIG. 6 shows a section of a typical packet taken at its approximate center noted in FIG. 3 as 6—6. Resilient O-ring 99 is adhered to or integrally formed to upper waterproof cover layer 78. Resting flatly upon tape 36 is a layer of suitable filter paper (not shown) and its outermost edges along with the outermost edges of cover layer 78 are securely adhered to tape 36 forming a waterproof seal at the joined edges. Filter paper 79 is adhered to cover layer 78 directly beneath O-ring 99 and may be more porous than the previously mentioned paper since its primary purpose is to retain finely ground coffee 80 within the packet. It is seen then that the packet will readily allow liquid entering through O-ring 99 to penetrate filter paper 79, coffee 80, the bottom filter paper layer (not shown) and eventually exit through perforations 80 in tape 36. The purpose of O-ring 99 is to secure a tight, leakproof fit between packet 34 and movable head 21 when pressure is sufficient. It is also important that the coffee or herb be ground somewhat finer than usual owing to the rapidity of this brewing process. To preserve the freshness of the coffee, these individual packets and associated paraphernalia may be manufactured in the presence of an inert gas such as nitrogen and then sealed in an air-tight container retaining this gas until usage. This arrangement allows the coffee to be stored for extended periods by the prevention of flavor-robbing oxidation.

Referring now to FIG. 5, a top or plan view of brewing basket 39 employed in the invention is shown in detail. It will be seen that recessed grooves 43 radiate from coffee outlet 42 (identified in FIG. 7) thereby allowing passage of liquid from grooves 43 to coffee outlet 42. Referring now to both FIG. 5 and FIG. 7, ridges 40 extend outward from sidewalls 100 a slight distance and each ridge runs the entire length of the basket forming a pair of channels corresponding in dimension to tape 36 in such a way that the tape may be threaded through the channels freely in a lengthwise fashion yet is compelled to remain within them, resisting any other movement. It must also be noted that packets 34 appearing on the tape are recessed sufficiently from the edges as to not encumber the passage of the tape through the channels.

Sensors 92 comprise a pair of metallic, conductive spring leaves which are securely fastened to ridge 40 of brewing basket 39 by rivets or other means. These sensors are electrically connected with conductors 95 and 96 which lead into the control circuit. Sensors 92 normally create an open circuit through conductors 95 and 96 due to the absence of a conductor bridging them and report the same to the control circuit. However, when both sensors contact a common conductor, current may flow through the circuit. Sensors 92 are placed in such a way as to align with the path of sensor patch 35 and each subsequent sensor patch as the tape as the tape is threaded through the brewing basket.

Referring now to FIG. 9, the circuit shown represents the control means by which the invention is regulated. While the general appearance and layout of the electrical features of the invention were shown in FIG. 1, their electrical function is more easily understood in the schematic of FIG. 9.

Normal house current is supplied at plug 56 and subsequently supplies transformer 59, resistance heater 57 and, intermittantly, transformer 75 and solenoid 74 with electrical power. Resistance heater 57 is regulated by thermostat 58 in order to provide a water temperature normally between 200° F. and 205°. Full wave bridge rectifier 60 converts the low-voltage alternating current of the secondary circuit of transformer 59 to direct current and capacitor 61 is of sufficient size to smooth out the wave form. Switch 62 is a momentary switch which is operatively connected to push button 33 shown in FIG. 2. Normally open relay 63 is interconnected in such a way as to be activated by either momentary switch 62 or it's own contacts 63'. Reel drive motor 64 is also activated by either relay 63 or switch 62 while both drive motor 64 and relay 63 are shortable at contacts 101 which represents the action of sensors 92 and sensor patch 35. The speed of pump motor 77 is controlled by potentiometer 65 and both are connected to full wave bridge rectifier 76 and transformer 75 so that a relatively safe. low-voltage direct current may be utilized since pump motor 77 operates near water which could present potential hazard. This arrangement represents the preferred embodiment since the intention has been to provide separate power supplies for the low drain, potentially sensitive components and the larger components which require greater power and could cause adverse effects in the control circuit. However, a single transformer may be employed provided that it is sufficiently large and is equipped with a relatively large capacitor in order to smooth out the significant fluctuations in the circuit. Beginning with antenna 70, the pin identifications of integrated circuit timer 66 are given moving clockwise as: trigger, output, control voltage, ground, threshold, discharge, Vcc and reset. Capacitors 68 and 69 are necessary for the operation of integrated circuit timer 66 and may be, for example, 10 microfarads and 0.01 microfarads respectively. The duration of "on time" of integrated circuit timer 66 is controlled by potentiometer 67 which may be, by sound example, 1 megaohms. Diodes 71 and 72 are also necessary for the operation of integrated circuit timer 66 while antenna 70 is electrically connected to the "trigger" of the timer and is respondent to electrical disturbances created within the circuit. Though it is normally not necessary to shield antenna 70 or connect it directly to other components, its length, positioning and location are not arbitrary and must be placed in such a way as to respond to a negative pulse originating at relay 63 but avoiding positions in which it may be affected by stray signals.

Reference is now made to FIG. 8 which illustrates the brewing process and sequence of events necessary to the operation of the present invention. The first step in the operation of the invention is step 45 "operator activate" which entails the depression of push button 33 which in turn momentarily closes switch 62. This results in the next step, 46, "latch on, tape advance". Briefly, the closure of momentary switch 62 causes a latching effect by energizing relay 63 while at the same time energizing drive motor 64, being the reel drive motor. This is achieved because contacts 63$^1$ are closed as soon as the relay is energized and it will be seen that such closure will allow the continued closure of these contacts as the relay coil is further energized thereby. Reel drive motor 64 continues to be energized by the same effect. In actual practice it may be found that relay 63 is energized slightly after drive motor 64 because of the motor's greater initial current drain. Because of this effect, transformer 59 must be of sufficient size to provide enough current to minimize the delay and cause relay 63 to latch quickly. This allows the operator to activate the apparatus quickly without having to sustain the action of switch 62. As can be seen in FIG. 1, reel drive motor 64 thus energized causes shaft 4 to be driven through the action of worm 5 and worm gear 6. As reel 1 is properly mounted on shaft 24 and secured by grip 25 or other means and tape 36 has been properly threaded through the previously mentioned channels of brewing basket 39 and secured to the spindle of reel 3 by adhesive tape or other means, it will be seen that rotation of shaft 4 will cause the rotation of reel 3 and consequently reel 3 pulls tape 36 through the channels of brewing basket 39. Also, reel 1 begins to rotate while holding the tape somewhat taut by the friction created at shaft 24. In addition, tape 36 begins to wind about the spindle of reel 3. This active condition of the apparatus prevails until step 47 (shown in FIG. 8) "packet sensor triggered".

Briefly, as the tape is pulled through the brewing basket, one of the previously mentioned conductive sensor patches 35 affixed to the tape approaches sensors 92 and soon arrives directly beneath in electrical contact with both sensors. As this occurs step 47 is complete which brings the apparatus into a new series of conditions illustrated in the flow diagram of FIG. 8 as: step 48 "tape advance and latch off", step 49 "movable head activate", step 50 "hot water pump on" and step 52 "timer on". It is observed that, as sensors 92 are in brief electrical contact with sensor patch 35, both reel drive motor 64 and relay 63 as well as most of the control circuit are temporarily shortcircuited. Consequently, relay contacts 63¹ open and reel drive motor 64 shuts off. However, due to the action of flywheel 7 (shown in FIG. 1), enough rotational energy is stored to continue the rotation of shaft 4 for a brief time. This causes reel 3 to continue to rotate briefly and consequently pulls tape 36, by sound example, a small fraction of an inch beyond that otherwise possible in the absence of the flywheel. As a result, sensor patch 35 moves slightly beyond at least one of the sensors (92) and opens the circuit at 101 in FIG. 9. This is extremely important to the operation of the invention as this circuit must be open in order for switch 62 to be effective in repeated activation of the apparatus as each cup of beverage is brewed individually.

Simultaneously, since the distance between the center of sensor patch 35 and the center of packet 34 is, as previously stated, a small fraction of an inch less than the distance between the center of sensors 92 and the center of brewing basket 39 and since this exemplary difference is nearly equal to the additional tape travel caused by the action of flywheel 7, packet 34 comes to rest at a position in which it is approximately centered in the brewing basket. This completes step 48 "tape advance and latch off".

Steps 49, 50 and 52 shown in FIG. 8 are shown as occurring simultaneously with step 48 for purposes of understanding the principles of the invention in operation. However, it will be seen that as a result of the short circuit created by sensor patch 35 at sensors 92, an electrical disturbance is created in the circuit that is sufficient to provide a negative pulse to antenna 70 which consequently triggers integrated circuit timer 66 into its "on" phase and, through the cooperation of diodes 71 and 72, a current flows through the coil of relay 73. When relay 73 is thus energized, contacts 73¹ are caused to close thereby energizing transformer 75 which supplies pump motor 77 with a suitable direct current while potentiometer 65 controls the speed of the motor. Therefore, while steps 48, 49, 50, and 52 occur within the same time frame, they are to be perceived as being somewhat asynchronous. Solenoid 74 is also energized by relay 73 which activates movable head 21.

The useful result of these above-mentioned actions in the present invention is that as solenoid 74 is energized, movable head 21 (FIG. 2) is forced downward to firmly rest upon packet 34 to affect a moderately secure sealing fit. As pump motor 77 has been energized simultaneously, centrifugal pump 13 begins operation by pumping previously heated water through flexible conduit 19 and consequently, via movable head 21, through packet 34. This is made possible because, as previously mentioned, movable head 21 affects a tight seal with packet 34 via O-ring 99. Note that in FIG. 2 packet 34 is shown slightly distorted owing to the redistribution of coffee particles resulting from water flow and the pressure exerted by movable head 21. Sufficient allowance must be provided for movable head 21 so that it may maintain the seal with O-ring 99 by moving downward in accompaniment with the distortion. Since the water is under relatively high pressure, the coffee grind very fine and the water relatively hot and since the whole process is greatly accelerated and virtually eliminates the need to steep the brew, the desired soluble compounds in the coffee are dissolved with the resultant brew flowing through the grooves (43) in brewing basket 39 to coffee outlet 42 and subsequently into cup 18. A small amount of overflow being bound to occur occasionally in this process, the semi-concave shape of brewing basket 39 becomes advantageous in assuming its volume. As the amount of liquid pumped is ultimately regulated by the length of time pump motor 12 remains on, it is obvious that the "on time" of integrated circuit timer 66 plays an important role in metering the amount of beverage brewed. As previously stated, integrated circuit timer 66 is adjusted with regard to "on time" by potentiometer 67. Thus by increasing or decreasing resistance, various amounts of beverage may be obtained. The adjustment of potentiometers 65 and 67 is relative and therefore, generally speaking, the adjustment of one will affect the adjustment of the other. Obviously if potentiometer 65 is adjusted to increase resistance to slow down pump motor 77 when a strong brew is desired, the rate of water flow is decreased as well and also requires the adjustment of potentiometer 67 to lengthen the "on time" of the circuit. Otherwise the cup would only fill partially. Also, when a weaker brew is desired and pump 77 is allowed to operate at high speed by a decreased in resistance of potentiometer 65, potentiometer 67 must be adjusted to decrease the "on time" of the timer circuit in order to prevent overflow at cup 18. Thus, step 50 "brew" is nearly complete.

While the cup is soon full, it is important to note that while the pump is on siphon relief valve 94 has been allowed to leak a minute amount of water through a small orifice at the side of the the part. This leakage is contained within the confines of reservoir 95. Next, step 51 "timer off" causes steps 53 and 54 shown in FIG. 8.

At the proper time integrated circuit timer 66 withdraws the current being supplied to relay 73 and pump motor 77 as well as solenoid 74 are shut off. Movable head 21 is consequently caused to return to position 21¹ by the action of spring 85 in order to allow sufficient clearance for packet 34 as well as subsequent packets. It will be seen that a small volume of liquid will be retained in conduit 84. This liquid as well as any collected within the brewing basket soon becomes a portion of the brew collected in the cup. The volume of conduit 84 is to be relatively small as to minimize this excess liquid. It is now apparent that the purpose of siphon relief valve 94 is to allow a stream of air to enter flexible conduit 19 via the small orifice to thereby interrupt natural siphoning action which would otherwise cause continued liquid flow through the conduit.

Upon completion of the above-mentioned steps (step 53 "hot water pump off" and step 54 "movable head off"), beverage 55 is ready for consumption. Obviously by repetition of this series of processes, numerous individual cups may be brewed. Periodically, the supply of packets must be replenished and water must be added at regular intervals. It is noted that as each fresh packet is advanced in the apparatus that used packets are wound upon reel 3 and when full can be discarded. Obviously, most of the excess water contained in the used packets will evaporate while some drippage may occur upon tray 91. This may be remedied by a simple sponge (not shown). It is also obvious that, when changing reels, a reel containing fresh packets must be provided and reel 1 may then become the "take-up" reel 3 by removing it from shaft 24 and securing it to shaft 4. Reels containing fresh packets of coffee or other herb may be maintained by vacuum packing or freezing in order to retain flavor although packing in the presence of an inert gas and then freezing is the preferred method.

As the clearance between reel 3 and tape 36 is minimal, air flow within the wound reel will ordinarily be nominal so that coffee may be maintained in a fresh condition for an extended time. Also, by minimizing the effect of oxidation by the above mentioned packing process, this period of time may be extended considerably. It is also obvious that the present invention may be employed in the preparation of teas and other herb beverages. Many of the same advantages will be found in their preparation.

While a preferred embodiment of the invention has been described, it is to be understood that modifications thereof fall within the scope of the invention, which is to be limited only by the appended claims viewed in the light of the prior art.

I claim:

1. A brewing apparatus comprising a reservoir containing water, means for heating and controlling the temperature of said water, storage means comprising a plurality of packets containing brewable substance affixed to a tape allowing liquid flow through said packets, said storage means allowing individual retrieval of said packets, a brewing basket receiving said storage means having an outlet for brewed liquid, movable head means comprising a head communicable with and providing water outlet to packets of said storage means being movable to allow intermittent tape passage, activation means for said movable head, pump means for conducting said water from said reservoir via conduit means to said movable head means, means for receiving and storing used packets and tape of said storage means, drive means for moving said storage means through said brewing basket, control means comprising operator activation means, latching means initiated by said operator activation means, said latching means interconnected with and controlling said drive means, sensor means for sensing position of packets of said storage means relative to said brewing basket, said sensor means defeating said latching means thereby, timing means interconnected with and responding to said sensor means, said timing means interconnected with and controlling said activation means for said movable head and said pump means, and timing control means interconnected with said timing means for providing timing control thereto.

2. A brewing apparatus in accordance with claim 1, wherein said packets each comprise a quantity of brewable substance retained between an upper waterproof cover layer and a lower layer of filter material, said upper waterproof cover layer having a hole, said hole covered by a layer of filter material affixed to said upper waterproof cover layer, and a resilient O-ring affixed to said upper waterproof over layer around and above said hole.

3. A brewing apparatus in accordance with claim 1, wherein said sensor means comprises a plurality of thin conductive patches affixed to said tape in a path aligning with a pair of conductive sensors fastened to said brewing basket so that as each said patch comes in contact with said sensors a conductive path will be created between the said sensors via each said patch.

4. A brewing apparatus in accordance with claim 1, wherein said movable head means comprises a sliding conduit affixed to a steel sleeve retained within a coil allowing normally vertical movement, said conduit equipped at one end with a flat head communicable with said packets in a normally water-tight fashion, and at the other end with flexible conduit.

5. A brewing apparatus in accordance with claim 1, wherein said brewing basket comprises a vessel of semi-convex shape with a pair of walls generally parallel having a pair of channels corresponding to said tape, said brewing basket allowing tape passage and causing said tape to conform to the general curvature within said brewing basket and restricting other movement by way of said channels, and said brewing basket having a liquid outlet communicating with a series of radially disposed grooves radiating from said liquid outlet.

6. A brewing apparatus in accordance with claim 1, wherein said tape of said storage means is wound upon a reel rotatable about a shaft, said tape threadable through said brewing basket and is received by yet another reel aligned in the general path of first said reel, last said reel caused to pull said tape through said brewing basket by said drive means causing rotation thereto.

7. A brewing apparatus in accordance with claim 1, wherein said conduit means is provided relief from siphoning action by a small orifice in said conduit means, said orifice being kept above said water in said reservoir to allow air to enter said conduit means and interrupt siphoning action thereby.

8. A brewing apparatus in accordance with claim 1, wherein said control means further comprises a transformer for providing power to the control circuit at a low voltage, full-wave bridge means for rectifying the output of said transformer, a capacitor for smoothing out the wave form of said output, a normally open relay interconnected with the rectified output of said transformer, a motor interconnected with the rectified output of said transformer and said relay in a parallel fashion, said relay and said motor subject to short circuit by said sensor means, a momentary switch interconnected with the rectified output of said transformer, said relay and said motor capable of being energized by either said momentary switch or the contacts of said relay thereby creating a latching effect, an integrated circuit timer provided with rectified power from said transformer, an antenna for receiving signals resulting from the action of said short circuit, a control voltage capacitor, a ground connection, a threshold capacitor, a potentiometer for adjusting "on time", a solenoid for operating said movable head means, a transformer for supplying low voltage power, full-wave bridge means for rectifying the output of last said transformer, a motor interconnected with the rectified output of last said transformer driving said pump means, a potentiometer for controlling the speed of last said motor, and a relay for controlling said solenoid and last said transformer, last said relay being energized by the output of said integrated circuit timer.

* * * * *